US012607402B2

(12) United States Patent
Smith

(10) Patent No.: US 12,607,402 B2
(45) Date of Patent: *Apr. 21, 2026

(54) SOLAR REFLECTIVE GRANULES AND PROCESSES FOR PRODUCING SAME

(71) Applicant: U.S. Silica Company, Katy, TX (US)

(72) Inventor: Rocky Lee Smith, Needmore, PA (US)

(73) Assignee: U.S. Silica Company, Katy, TX (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/543,523

(22) Filed: Dec. 18, 2023

(65) Prior Publication Data

US 2024/0159046 A1 May 16, 2024

Related U.S. Application Data

(63) Continuation of application No. 16/911,073, filed on Jun. 24, 2020, now Pat. No. 11,846,098.

(60) Provisional application No. 62/866,790, filed on Jun. 26, 2019.

(51) Int. Cl.

| | |
|---|---|
| *F26B 3/12* | (2006.01) |
| *C04B 14/04* | (2006.01) |
| *C04B 14/10* | (2006.01) |
| *C04B 14/30* | (2006.01) |
| *E04D 7/00* | (2006.01) |

(52) U.S. Cl.
CPC ............. *F26B 3/12* (2013.01); *C04B 14/041* (2013.01); *C04B 14/043* (2013.01); *C04B 14/10* (2013.01); *C04B 14/106* (2013.01); *C04B 14/30* (2013.01); *C04B 14/305* (2013.01); *E04D 7/005* (2013.01); *C01P 2004/11* (2013.01); *C01P 2006/10* (2013.01); *C01P 2006/60* (2013.01); *C01P 2006/90* (2013.01); *Y02A 30/254* (2018.01); *Y02B 80/00* (2013.01)

(58) Field of Classification Search
CPC ....... E04D 7/005; Y02A 50/254; Y02B 80/00; C01P 2004/11; C01P 2006/10; C01P 2006/60; C01P 2006/90; C04B 14/10; C04B 14/106; C04B 14/30; C04B 14/305; C04B 14/043; C04B 14/041
See application file for complete search history.

(56) References Cited

U.S. PATENT DOCUMENTS

| | | | |
|---|---|---|---|
| 3,586,523 A | 6/1971 | Fanselow et al. | |
| 4,830,673 A | 5/1989 | Jones et al. | |
| 9,303,407 B2 * | 4/2016 | Sexauer | E04D 7/005 |
| 11,846,098 B2 * | 12/2023 | Smith | C09C 1/28 |
| 2011/0086201 A1 | 4/2011 | Shiao et al. | |
| 2017/0158865 A1 * | 6/2017 | Kratochvil | C09C 1/42 |
| 2017/0174575 A1 | 6/2017 | Li et al. | |
| 2018/0058067 A1 * | 3/2018 | Lake | E04B 1/2403 |
| 2019/0225545 A1 | 7/2019 | Yildirim et al. | |

FOREIGN PATENT DOCUMENTS

| | | |
|---|---|---|
| CN | 102964961 A | 3/2013 |
| JP | 201848310 A | 3/2018 |
| JP | 2019507823 A | 3/2019 |
| WO | 2017156088 A1 | 9/2017 |

* cited by examiner

*Primary Examiner* — C Melissa Koslow
(74) *Attorney, Agent, or Firm* — The Webb Law Firm

(57) ABSTRACT

A reflective particulate material includes a particulate substrate having high total solar reflectance, bulk and apparent densities and toughness, and a low dust index. The reflective particulate can have a total solar reflectance of 80% to 87%, a toughness of 1% or fewer fines, an apparent density of 2.75 $g/cm^3$ or greater, and a dust index of 1 or lower. A method of manufacturing the reflective particulate material includes preparing a slurry of the particulate substrate, spray drying the slurry to form a spray dried particulate, crushing the spray dried particulate to form a crushed particulate, and heating/calcining the crushed particulate. The heated, crushed particulate may further be coated to form a coated roofing granule.

10 Claims, 4 Drawing Sheets

Bulk Density Versus Fines

Fitted Line Plot
TSR = 1.126 - 0.2250 Bulk Density

SOLAR REFLECTIVE GRANULES AND PROCESSES FOR PRODUCING SAME

CROSS-REFERENCE TO RELATED APPLICATIONS

This application is a continuation of U.S. patent application Ser. No. 16/911,073, filed Jun. 24, 2020, now U.S. Pat. No. 11,846,098, issued on Dec. 19, 2023, which claims priority to U.S. Provisional Application No. 62/866,790, filed on Jun. 29, 2019. The entire disclosures of the above applications are incorporated herein by reference.

FIELD

The present disclosure relates to a particulate material and processes for producing same, wherein the particulate material is useful as solar reflective granules or granular layers in a roofing material.

BACKGROUND

This section provides background information related to the present disclosure which is not necessarily prior art.

Commercial and residential roofs are continuously exposed to harsh or extreme elements. Even under moderate external conditions, roofs are exposed to environmental and weather conditions that affect their ability to insulate the building or residence interiors from the effects of environmental or weather conditions. During the summer months in many parts of the world, roofs are continuously exposed to high heat and sunny conditions under which the roofing materials absorb solar energy and retain high levels of heat. As the roofs absorb the solar energy and retain the heat, the conditions inside the underlying buildings or residences suffer adversely, often causing the interiors to heat up to uncomfortable conditions. To remedy these conditions, buildings or residences often resort to increased amounts of internal insulation, or increased use of engineered cooling systems (e.g., HVAC equipment). However, increasing the amount of insulation has a limited ability to reduce heat transfer, and higher energy costs make increased use of engineered cooling systems undesirable and possibly cost-prohibitive.

In an effort to address this concern and to satisfy California based governmental regulations, roofing material manufacturers strive for high total solar reflectance to maintain cooler roof temperatures. However, the state of the art roofing materials (such as asphalt and modified bitumen) are black in color, which correspondingly have low solar reflectivity. To compensate for this shortcoming, some roofing material manufactures apply lighter colored granules on the asphalt or modified bitumen to increase solar reflectivity. Unfortunately, to date, many of these lighter colored granules or granular layers provide only modest improvements in the solar reflectivity, and the system solar reflectance still falls short of the California Cool Roof minimum total solar reflectance values.

SUMMARY

This section provides a general summary of the disclosure and is not a comprehensive disclosure of its full scope or all of its features.

The present disclosure describes a particulate material and processes for producing same useful as solar reflective granules or granular layers in a roofing material. The particulate or granular material includes solar reflective granules or particulates having a bulk total solar reflectance (also referred to herein as "total solar reflectance" or simply "solar reflectance") of 70% or greater as measured using a reflectometer from Surface Optics Corporation (San Diego, California).

In one aspect, the present disclosure provides a reflective particulate material, comprising a particulate substrate having a total solar reflectance of 80% to 87%, a toughness as measured according to ASTM D1865M-09 less than or equal to 1% fines, an apparent density of equal to or greater than 2.75 g/cm$^3$ and a dust index less than or equal to 1.

In another aspect, the present disclosure provides a process for manufacturing a reflective particulate material. Slurry including a particulate mixture is spray dried to form a spray dried particulate. The spray dried particulate is crushed to form a crushed particulate. The crushed particulate is heated and calcined.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

These and other features and advantages of embodiments of the present disclosure will be better understood by reference to the following detailed description when considered in conjunction with the accompanying drawings, in which.

Corresponding reference numerals indicate corresponding parts throughout the several views of the drawings.

DETAILED DESCRIPTION

Figure 1:
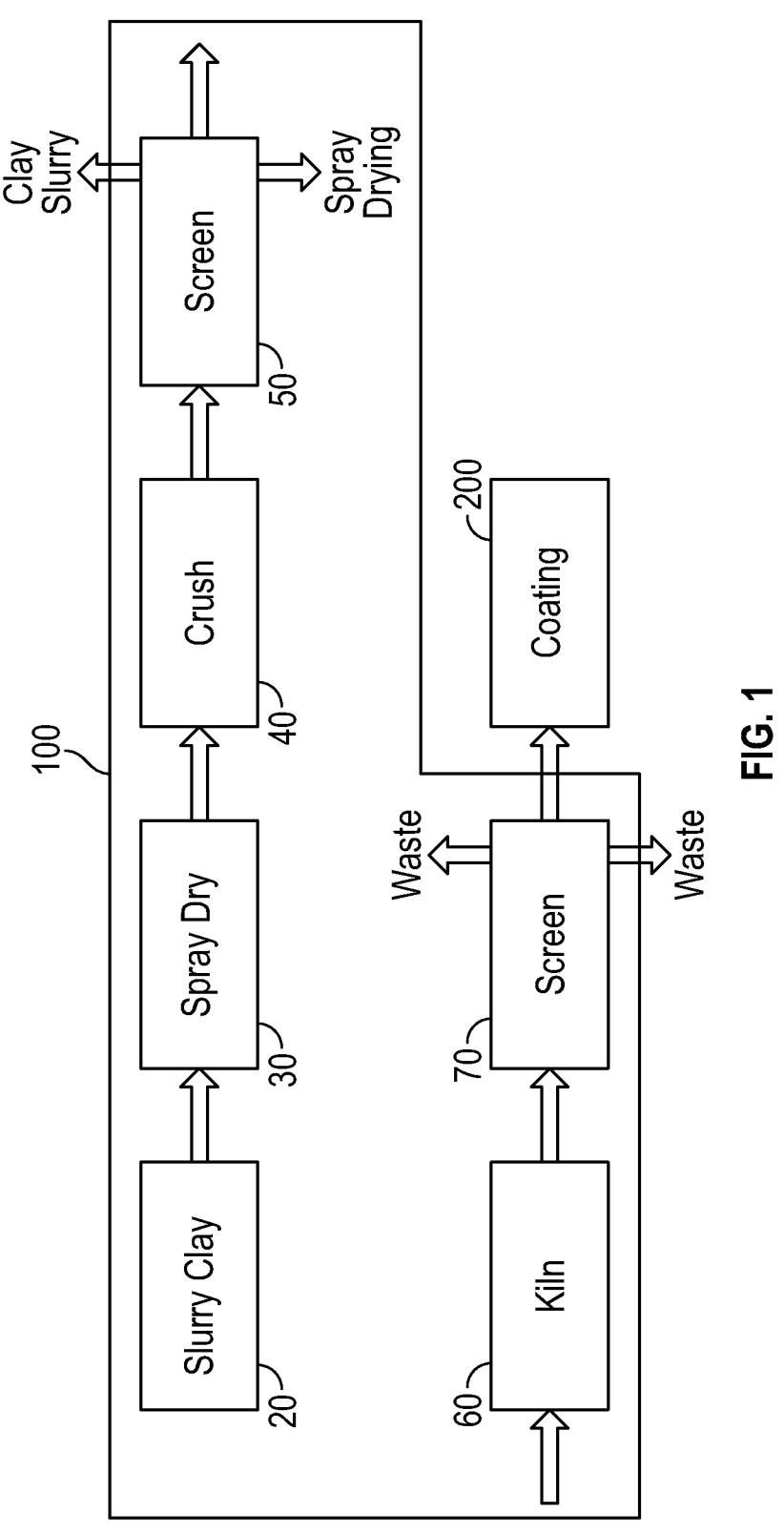
FIG. 1 is a schematic showing a system and method for manufacturing uncoated particulates according to embodiments of the present disclosure.

Example embodiments will now be described more fully with reference to the accompanying drawings.

The reduction of heat transfer from the external environment to the interior working or living space of a building is becoming increasingly important as the cost of energy increases. While the interior space of a residence or building can generally be kept comfortable through engineered cooling systems (e.g., HVAC systems), as energy costs rise, the cost of maintaining a comfortable working or living space also rises. Consequently, methods for reducing the transfer of heat from the external environment to the interior space of a building or residence are desirable. Indeed, such a reduction of heat transfer would reduce artificial cooling system run times needed to maintain a comfortable interior space, thereby reducing the amount of energy consumed by those cooling systems.

According to embodiments of the present invention, a particulate material is useful as solar reflective granules or granular layers in a roofing material. The particulate or granular material includes solar reflective granules or particulates having a bulk total solar reflectance (also referred to herein as "total solar reflectance" or simply "solar reflectance") of 70% or greater as measured using a reflectometer from Surface Optics Corporation (San Diego, California). For example, the 410-Solar visible/NIR Portable Reflectometer from Surface Optics Corporation (San Diego, California) may be used, which measures reflectance over 7 distinct wavelength bands and then uses an algorithm to calculate the total solar reflectance. In some embodiments, the particulate or granular material has a solar reflectance of at least 60%, for example, at least 70% or at least 80%. In some embodiments, the coated particulate material may have a solar reflectance of at least 80%, and in some embodiments, it may have a total solar reflectance of at least 85%, or at least 90%. For example, in some embodiments, the particulate material may have a total solar reflectance of 90% or greater. For example, in some embodiments, the coated particulate material has a solar reflectance of 60% to 95%, 70% to 95%, 80% to 95%, 70% to 90%, 80% to 90%, 85% to 95%, or 90% to 95%.

In some embodiments, the particulate material may be coated to improve hydrophobicity, staining and other performance characteristics. The particulate material according to embodiments of the present invention may have a total solar reflectance within the above-described ranges, whether the material is coated or uncoated. In some embodiments, however, the uncoated particulate material may have a total solar reflectance different from the corresponding reflectance of the coated counterpart material. For example, in some embodiments, the uncoated particulate material may have a total solar reflectance that is higher than the corresponding reflectance of the coated counterpart material. While the coated and uncoated versions of the particulate material may both have a total solar reflectance within the same range (as discussed above), the coated and uncoated versions of the material may have different total solar reflectance values within the same range. Indeed, in some embodiments, for example, the uncoated particulate material may have a total solar reflectance of 80% or 90% or higher while the coated particulate material may have a total solar reflectance of 60 or 70% or higher.

As used herein, the terms "particulate material," "granular material," "solar reflective particulates," "solar reflective granules," "reflective particulates," "reflective granules," and like terms are used interchangeably to refer to the uncoated particles or granules of material described in this disclosure. Similarly, the terms "coated particulate material," "coated granular material," "coated solar reflective particulates," "coated solar reflective granules," "coated reflective particulates," "coated reflective granules," and like terms are used interchangeably to refer to the particles or granules of material described in this disclosure after coating. Additionally, while the particulates and granules described herein are touted for their efficacy in "cool roof" applications, it is understood that the described particulates and granules may have other uses and applications, and that the described embodiments are not limited to "cool roof" applications. For example, in some embodiments, the particulate or granular materials described herein may be useful on any exterior surface, for example, as a filler in an exterior paint, or similar applications.

According to embodiments of the present invention, the reflective particulates or granules (uncoated) include a particulate (or granular) substrate having high total solar reflectance, and improved hardness and dust index properties. In some embodiments, the reflective particulates or granules may also have a coating on the particulate substrate, which may impart further improvements in the dust index and toughness, as well as improved hydrophobicity and staining performance. The reflective particulates or granules (uncoated) may be coated by any suitable means using any suitable coating materials. For example, in some embodiments, the granules may be coated by the methods and using the materials disclosed in any of U.S. Pat. No. 11,479,675 titled "COATED SOLAR REFLECTIVE GRANULES AND METHODS OF MANUFACTURING THE SAME," filed on Mar. 29, 2019, U.S. Pat. No. 10,501,636 titled "SOLAR REFLECTIVE PARTICULATES," filed on Feb. 12, 2018, U.S. Pat. No. 10,253,493 titled "PARTICULATES HAVING HIGH TOTAL SOLAR REFLECTANCE," filed on Aug. 29, 2016, and U.S. Pat. No. 9,890,288 titled "SOLAR REFLECTIVE PARTICULATES," filed Dec. 8, 2015, the entire contents of all of which are incorporated herein by reference.

To prepare a final, coated particulate that has the solar reflectance values noted above, the uncoated particulate substrate must have a relatively high total solar reflectance (i.e., prior to coating). That being said, the particulate substrate is not particularly limited, and may include any suitable particulate substrate having an appropriate total solar reflectance value before coating. For instance, the substrate should have a solar reflectance when uncoated that is sufficiently high that the total solar reflectance of the counterpart coated substrate falls within the ranges discussed above. For example, in some embodiments, the substrate may include any material that exhibits a total solar reflectance (on its own, i.e., prior to coating) of 80% or greater. Non-limiting examples of suitable such substrates include transition metal oxides, clays, calcium silicates (e.g., wollastonite) and pyrophyllites. For example, in some embodiments, the substrate may include a transition metal oxide, a calcium silicate (e.g., wollastonite), a pyrophyllite and/or a kaolin clay. In some embodiments, for example, the substrate may include titanium dioxide, a pyrophyllite, a calcium silicate (e.g., wollastonite), a hydrous kaolin clay and/or a calcined kaolin clay. In some embodiments, for example, the substrate may include a clay, for example, a hydrous kaolin clay, or a calcined kaolin clay, one non-limiting example of which is a calcined kaolin chamotte. Non-limiting examples of suitable substrates include calcium silicates (e.g., wollastonite), AS 45 chamotte (e.g., having an $SiO_2$ content of about 54.9%, an $Al_2O_3$ content of about 42.4%, and a $K_2O$ content of about 1.4%) available from Amberger Kaolinwerke Eduard Kick GmbH & Co. ("AKW") (an affiliate company of Quarzwerke GmbH) (Hirschau, Germany), EPK kaolin (e.g., having an Fe content of about 0.93 wt %, where the reported Fe content is adjusted to exclude loss-on-ignition (LOI) and normalized to a total oxide content of 100%) available from Edgar Minerals (Edgar, FL), MCNAMEE® kaolin (e.g., having an Fe content of about 0.38 wt %, where the reported Fe content is adjusted to exclude LOI and normalized to a total oxide content of 100%) available from Vanderbilt Minerals, LLC (Norwalk, CT), Kingsley kaolin (e.g., having an Fe content of 0.45 wt %, where the reported Fe content is adjusted to exclude LOI and normalized to a total oxide content of 100%) available from Kentucky-Tennessee Clay Company (Roswell, GA), 6 TILE® kaolin (e.g., having an Fe content of about 0.4 wt %, where the reported Fe content is adjusted to exclude LOI and normalized to a total oxide content of 100%) available from Kentucky-Tennessee Clay Company (Roswell, GA), optiKasT kaolin (e.g., having an Fe content of about 0.58 wt %, where the reported Fe content is adjusted to exclude LOI and normalized to a total oxide content of 100%) available from Kentucky-Tennessee Clay Company (Roswell, GA), Ione Airfloated Kaolin (e.g., having an Fe content of about 0.7 wt %, where the reported Fe content is adjusted to exclude LOI and normalized to a total oxide content of 100%) available from Ione Minerals, Inc. (Ione, CA), the ASP® line of products (e.g., ASP G90, and ASP G92), M17-052 available from BASF Corporation (Florham Park, NJ), the PYRAX® line of products (e.g., Pyrax HS) available from R.T. Vanderbilt Company, Inc. (Norwalk, CT), and the TK line of products (including, e.g., TK1827, TK1828, TK1912, TK1913, TK1914, TK1915, TK1916, TK1917, with an Fe+Ti content of 0.5% to 1.8%) available from Thiele Kaolin Company (Sandersville, GA).

The particle size and particle size distribution of the substrate are not particularly limited. As such, the substrate may have any suitable average particle size, and any suitable particle size distribution, and these values may vary depending on the intended application of the granules (e.g., as a cool roof material on a commercial roof or a residential roof, or as a filler in a paint). Indeed, in embodiments in which the substrate is a mineral, e.g., embodiments in which the substrate includes a clay (e.g., a kaolin clay, or calcined kaolin clay), the average particle size and the particle size distribution may vary depending on the source or supplier of the substrate material.

According to embodiments of the present disclosure, the uncoated particulate substrate also has high toughness as well as high total solar reflectivity and a smoother surface. This combination of features is generally difficult to obtain in such an uncoated particulate because increased bulk density and toughness typically decrease total solar reflectivity.

The toughness of the uncoated particulate may be determined by any suitable standard. In some embodiments, for example, the toughness is determined according to ASTM D1865M-09, the disclosure of which is incorporated by reference herein. In general, ASTM D1865M-09 describes a method of determining toughness that compares the initial particle distribution to the particle distribution after multiple 1.2 meter drops. More specifically, the difference in the percentage of fines measured before and after the multiple drops indicates how well the particulates hold up to the stress of the multiple drops, and therefore, fewer fines after the multiple drops (or a smaller difference between pre-drop and post-drop fines) indicates a tougher material (i.e., a higher toughness value). According to some embodiments, for example, the difference in pre-drop percentage of fines and post-drop percentage of fines (after 100 drops from a 1.2 meter height), as measured by ASTM D1865M-09, is 0 to 3%, 0 to 2%, 0 to 1.5%, or 0 to 1%. In some embodiments, for example, the difference in pre-drop percentage of fines and post-drop percentage of fines (after 100 drops from a 1.2 meter height), as measured by ASTM D1865M-09, may be 0, 0.1, 0.2, 0.3, 0.5, 0.6, 0.8, 0.9, or 1.7%.

In some embodiments, the bulk density of the uncoated particulates may be 1.00 to 2.00 g/cm$^3$, 1.00 to 1.50 g/cm$^3$, 1.00 to 1.40 g/cm$^3$, 1.00 to 1.30 g/cm$^3$, or 1.00 to 1.20 g/cm$^3$. For example, in some embodiments, the bulk density may be 1.05, 1.06, 1.07, 1.08, 1.09, 1.11, 1.12, 1.15, 1.16, 1.17, 1.18, 1.19, or 1.20 g/cm$^3$. Additionally, in some embodiments, the uncoated particulates may have an apparent density of 2.75 g/cm$^3$ or greater, for example 2.76 g/cm$^3$ or greater, 2.77 g/cm$^3$ or greater, 2.78 g/cm$^3$ or greater, or 2.79 g/cm$^3$ or greater. In some embodiments, the uncoated particulates may have an apparent density of 2.79 g/cm$^3$. Indeed, the uncoated particulates according to embodiments of the present disclosure have a higher apparent density than currently available products, which have an apparent density of 2.66 g/cm$^3$ or 2.72 g/cm$^3$.

According to some embodiments, the uncoated particulates may have a total solar reflectance as described above. In some embodiments, for example, the total solar reflectance (as measured using the 410-Solar visible/NIR Portable Reflectometer from Surface Optics Corporation (San Diego, California)) may be 80% or greater, for example 80% to 95%, 80% to 90%, 80% to 89%, 83% to 90%, 83% to 89%, 84% to 90%, 84% to 89%, 85% to 90%, 85% to 89%, 86% to 90%, 86% to 89%, 87% to 90%, 87% to 89%, 88% to 90%, or 88% to 89%. In some embodiments, for example, the total solar reflectance (as measured using the 410-Solar visible/NIR Portable Reflectometer from Surface Optics Corporation (San Diego, California)) may be 84.8%, 85.3%, 85.7%, 85.9%, 86.5%, 87.2%, 87.3%, 88.0%, 88.1%, 88.2%, 88.3%, 88.4%, 88.5%, or 88.7%.

Also, in some embodiments, the uncoated particulates may also have a lower dust level. The amount of dust in a sample of the uncoated substrate particles may be represented by a dust index, which measures the quantity of dust in the sample. The dust index may be measured by the DustMon dust measurement device (available from Microtrac Inc., Montgomeryville, Pennsylvania). The dust index is a measure of airborne dust in a sample of particles. To determine the dust index, particles are dropped into a sample container at the top of a fixed length of pipe, and the particles drop into a sample collector at the other end of the pipe. When the particles land in the sample collector, air currents and the force of the impact cause the sample dust to travel back upwards to a measurement area which contains a light source and a detector. The detector observes changes in light intensity from the light source. Sample dust obstructs a portion of the light from the light source, and the detector senses the decrease in light intensity, and outputs a dust index based on the decrease in light intensity. The dust index is the sum of the maximum dust concentration plus the dust concentration after 30 seconds. The dust concentration is reported in percentage (%), where 100% refers to complete blockage of light from the light source at the detector.

In some embodiments, the uncoated particulates have a dust index (as measured by DustMon) of less than 3, and in some embodiments, less than 2, or less than 1. For example, in some embodiments, the uncoated particulates may have a dust index of 0.3 to 1.5, for example 0.3 to 1.0, 0.4 to 0.9, or 0.5 to 0.8. In some embodiments, the uncoated particulates may have a dust index of 0.5, 0.6, 0.7 or 0.8.

As a point of comparison, conventional uncoated particulates (e.g., prepared according to the conventional process discussed below) can have a dust index of over 14, for example, some uncoated clay particles have a dust index of 14.9 to 27.4. Indeed, some coated particles may have higher dust indices than the uncoated particles according to embodiments of the present disclosure. For example, particles coated by a conventional process may have a dust index of over 3, for example, from 3 to 5, 3 to 4, 3.4 to 3.8, or 3.5. As can be seen from this comparison, the uncoated particulates according to embodiments of the present disclosure have significantly reduced dust indices compared to both conventional uncoated particulates as well as some conventional coated particles.

According to some embodiments, as shown generally in FIG. 1, a system 100 for preparing the uncoated particulates described herein includes a slurry mixer 20, a spray drying apparatus 30, a particle crusher 40, a first screen 50 (or other particle filter), a kiln 60 (or other heating device), and a second screen 70 (or other particle filter). As shown in FIG. 1, the system 100 for preparing the uncoated particulates can deliver the as-prepared uncoated particulates directly or indirectly to another system or apparatus 200 for coating the particulates. The slurry mixer 20 is not particularly limited and may be any apparatus or chamber capable of holding and mixing the components of the slurry (discussed further below) and delivering the slurry to the drying apparatus 30.

According to embodiments of the present disclosure, the drying apparatus 30 is a spray dryer. Any suitable spray dryer capable of spraying the slurry (described further below) or thermally spray drying the slurry may be used. Nonlimiting examples of suitable spray dryers include those available from GEA Process Engineering A/S Corporation (DENMARK). For example, in some embodiments, the spray dryer may be one of the NIRO® line of spray dryers available from GEA Process Engineering A/S Corporation (DENMARK).

Figures 2, 3:
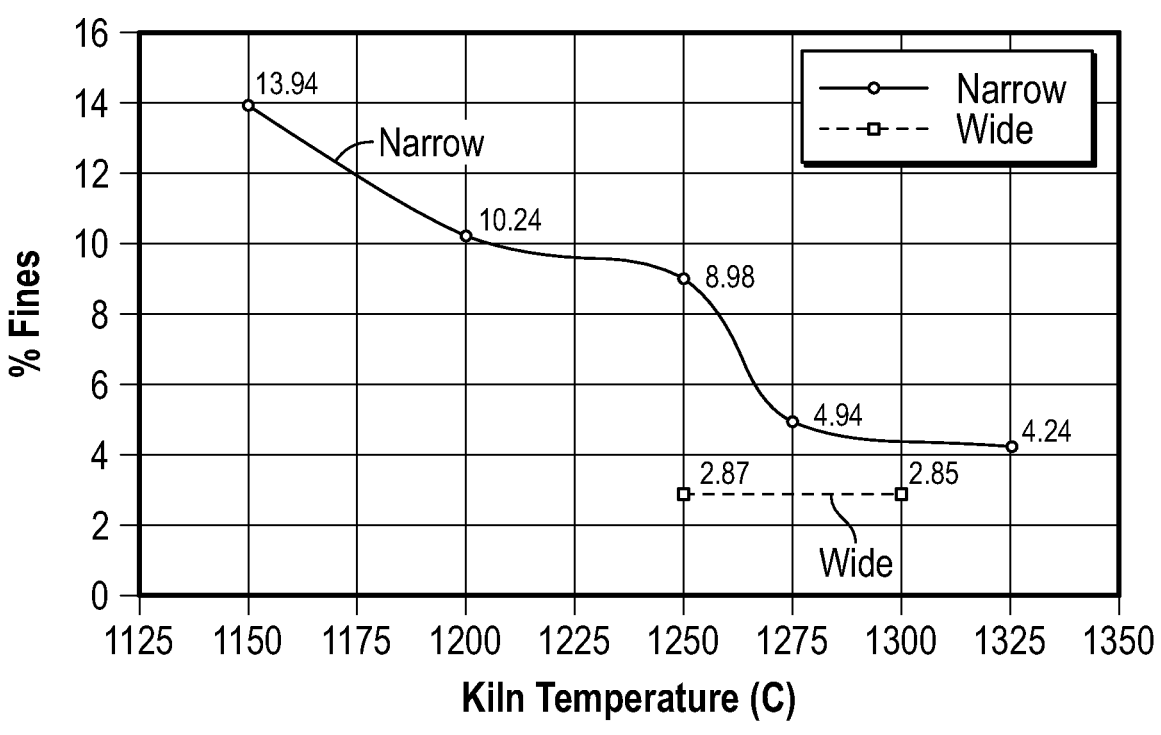
FIG. 2 is a graph depicting the effect of the crusher gap setting on the toughness of the uncoated particulates according to embodiments of the present disclosure.
FIG. 3 is a graph depicting the effect of kiln temperature on the total solar reflectance (or reflectivity) of the uncoated particulates according to embodiments of the present disclosure

Similarly, any suitable particle crushing apparatus may be used as the particle crusher. In some embodiments, for example, the crushing apparatus may be a roll crusher, but the present disclosure is not limited thereto. Nonlimiting examples of suitable particle crushers include those available from J.C. Steele & Sons Inc. (Statesville, North Carolina), Sturtevant Inc. (Hanover, Maryland), TerraSource Global Corp. (St. Louis, Missouri; e.g., the Gundlach line of crushers), Metso Corp. (FINLAND), and McLanahan Corp. (Hollidaysburg, Pennsylvania). In some embodiments, however, the gap setting on the particle crusher may be adjusted to produce uncoated particulates having the toughness and dust index characteristics described herein. For example, while any suitable gap setting can generally be used, if the gap is set too narrow, additional dust may be generated during the toughness test, thus increasing the amount of fines, and decreasing the toughness rating. According to embodiments of the present disclosure, relatively minor or miniscule changes in the gap setting on the particle crusher can dramatically affect the toughness of the resulting uncoated particulate. Indeed, as shown in the graph of FIG. 2, the difference between a wide gap of 0.065" and a narrow gap of 0.045" show drastically different fines production. For example, as shown in FIG. 2, at the same kiln temperature of 1250° C., the narrow gap (0.045") produced 8.98% fines while the wide gap (0.065") produced only 2.87% fines. As can be seen from this, miniscule adjustments to the gap setting on the crusher can have either highly beneficial or extremely detrimental results on the toughness of the resulting uncoated particulate. Accordingly, while the gap setting may be adjusted as needed according to the particles being crushed, in some embodiments, the particle crusher may have a gap setting of 0.06" to 0.07".

The first and second screens (or other particle filters) are not particularly limited and may be any suitable screens or filters capable of retaining larger particles and allowing smaller particles to pass through. Those of ordinary skill in the art would be capable of selecting an appropriate screen or filter from among the many commercial options available. In some embodiments, however, both the first and second screens (or filters) 50 and 70 may be double screens (or double screen shakers) in which a larger one of the double screens retains particles larger than mesh 8 (i.e., 2380 microns), and a smaller one of the double screens retains particles larger than mesh 100 (150 microns). The particles falling between the larger and smaller screens of the first screen 50, i.e., those smaller than mesh 8 but larger than mesh 100 are delivered directly to the kiln 60 from the double screen shaker. The small particles that pass through the smaller screen of the first screen 50, i.e., those smaller than mesh 100, are delivered back to the spray dryer 30 where they can gain particle size before being redelivered to the crusher 40. The larger particles that are retained on the larger screen of the first screen 50 are delivered back to the slurry mixer 20.

The kiln is also not particularly limited and may be any suitable rotary kiln or similar apparatus. Nonlimiting examples of suitable kilns include those manufactured by and/or available from Feeco International Inc. (Green Bay, Wisconsin), FLSmidth A/S (DENMARK), Claudius Peters AG (GERMANY), IKD Processing Machinery (Louisville, Kentucky) and Allis-Chalmers Manufacturing Corp. (Milwaukee, Wisconsin). In some embodiments, the kiln may be directly fired or indirectly fired, and in some embodiments, the kiln may be directly fired. Additionally, the kiln could be fired by electricity, natural gas, propane, or any other fuel source. In some embodiments, for example, the kiln may be fired by natural gas as an economical fuel choice.

The temperature of the kiln may be adjusted to produce uncoated particulates having the total solar reflectance described herein. For example, while any suitable temperature can generally be used, if the temperature is set too high, the total solar reflectance may be adversely affected, as shown in FIG. 3. Indeed, from a morphological viewpoint, the particulates transform through different phases under heat, including further drying, a metakaolin (2.6 $g/cm^3$) form, a spinel transformation (3.58 $g/cm^3$), and ultimately a platelet mullite (3.05 $g/cm^3$) structure. After reaching a certain (or critical) temperature, the particulates darken, which results in improved toughness, but lower total solar reflectivity. Accordingly, the temperature of the rotary kiln should be adjusted or set to a threshold or critical temperature to obtain the desired balance between total solar reflectivity and toughness. In some embodiments, for example, the kiln temperature may be 1050° C. to 1250° C., or 1100° C. to 1200° C.

Figure 4:
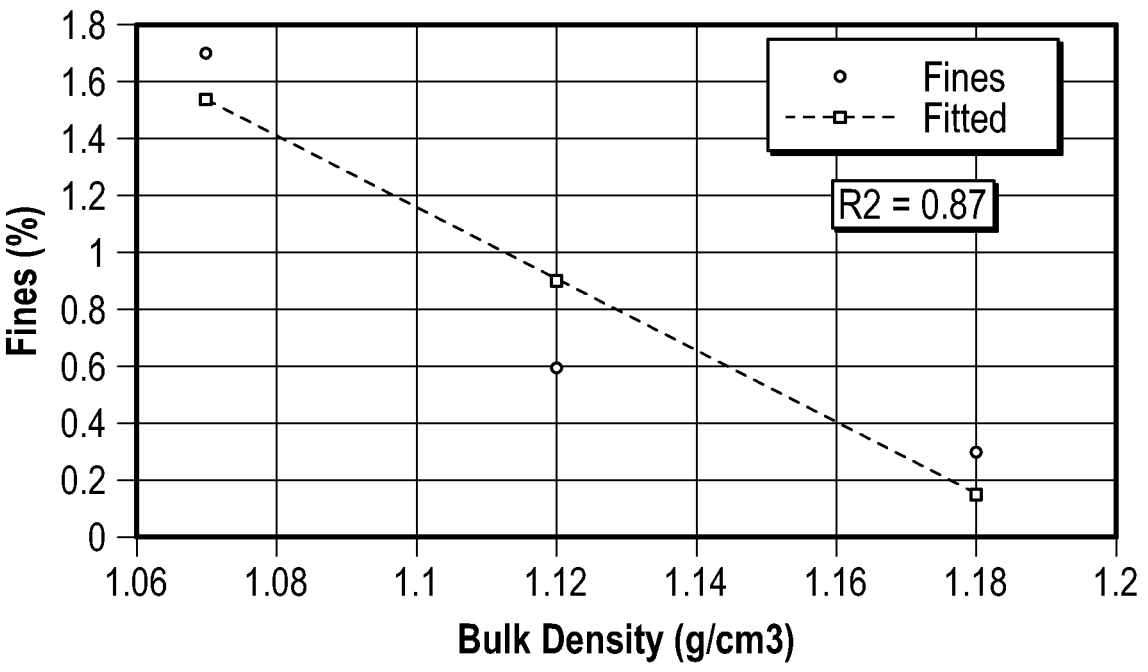
FIG. 4 is a graph depicting a correlation between bulk density and toughness (i.e., fines %)
Figure 5:
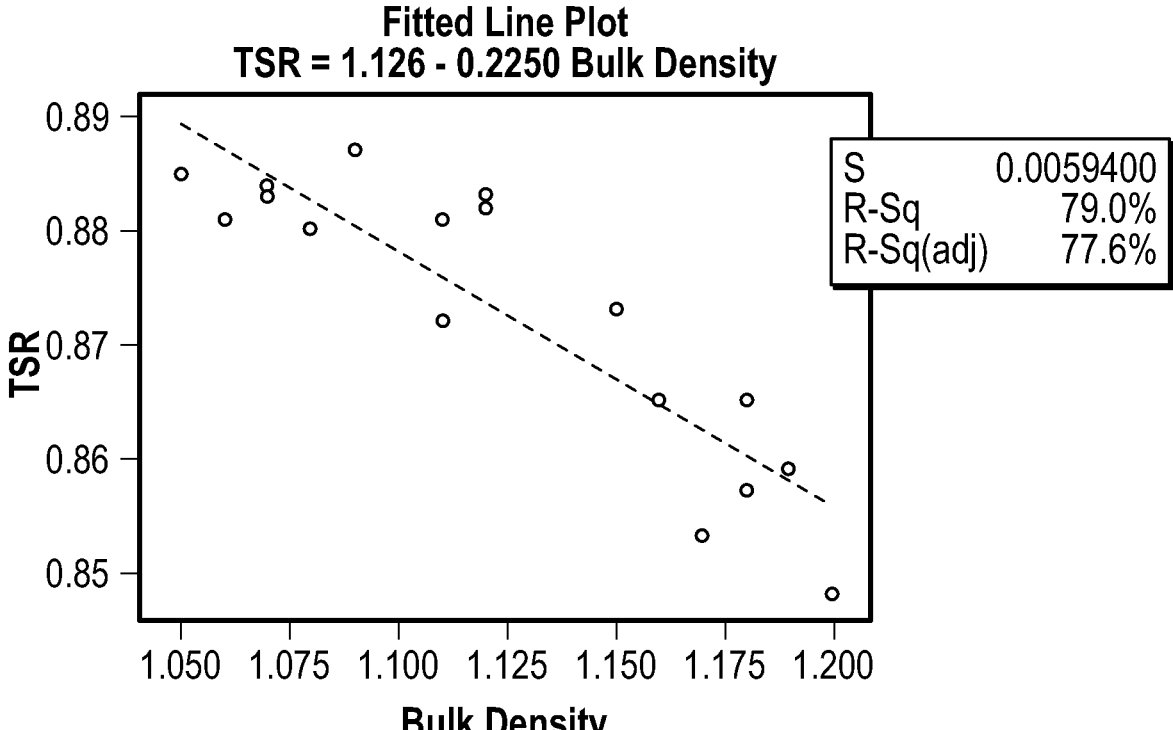
FIG. 5 is a graph depicting a correlation between bulk density and total solar reflectance reported.

The kiln temperature and the crusher settings can also affect the apparent and bulk densities of the uncoated particulates according to embodiments of the present disclosure. For example, the bulk density of the resulting uncoated particulates increases with higher kiln temperatures, which leads to the correlation between bulk density and toughness (i.e., fines %) reported in FIG. 4, and the correlation between bulk density and total solar reflectance reported in FIG. 5.

After the rotary kiln, the uncoated particulates are cooled and then screened again through the second screen 70 (described above). Similar to the first screen 50, the particles separated by the second screen 70 can be recycled back into the slurry mixer 20 or spray dryer 30. Specifically, the particles falling between the larger and smaller screens of the second screen 70, i.e., those smaller than mesh 8 but larger than mesh 100 are delivered directly to the coating operation/system 200 from the double screen shaker 70. The small particles that pass through the smaller screen of the second screen 70, i.e., those smaller than mesh 100, may be delivered back to the spray dryer 30 where they can gain particle size before being delivered back through the crusher 40, first screen 50 and kiln 60. The larger particles that are retained on the larger screen of the second screen 70 may be delivered back to the slurry mixer 20. While the particles exiting the kiln can be recycled in this manner, it is understood that the particles exiting the kiln 60 and second screen 70 need not be recycled. Indeed, reintroducing the screened particulates back into the slurry mixer or spray dryer through the return stream over multiple cycles may darken the product. However, the losses introduced by this risk are low.

According to embodiments of the present disclosure, a process for preparing uncoated particulates having high total solar reflectance, high bulk and apparent densities, high toughness, and low dust includes preparing a particulate slurry, spray drying the particulate slurry to yield dried uncoated particulates, crushing the dried uncoated particulates to yield crushed uncoated particulates, and heating (or calcining) the crushed uncoated particulates. After heating (or calcining) the crushed uncoated particulates, the particulates can be cooled and then coated to form coated solar reflective granules. As noted above, any suitable coating process and coating material may be used, for example, the methods and materials disclosed in any of the following disclosures: U.S. Pat. No. 11,479,675 titled "COATED SOLAR REFLECTIVE GRANULES AND METHODS OF MANUFACTURING THE SAME," filed on Mar. 29, 2019; U.S. Pat. No. 10,501,636 titled "SOLAR REFLECTIVE PARTICULATES," filed on Feb. 12, 2018; U.S. Pat. No. 10,253,493 titled "PARTICULATES HAVING HIGH TOTAL SOLAR REFLECTANCE," filed on Aug. 29, 2016; and U.S. Pat. No. 9,890,288 titled "SOLAR REFLECTIVE PARTICULATES," filed Dec. 8, 2015. The entire contents of the foregoing disclosures are expressly incorporated herein by reference. For example, in some embodiments, the uncoated particulates may be coated using the processes and methods described in U.S. patent application Ser. No. 16/370,303 titled "COATED SOLAR REFLECTIVE GRANULES AND METHODS OF MANUFACTURING THE SAME," filed on Mar. 29, 2019.

In some embodiments, the slurry may be prepared by mixing the particulate substrate described herein with a suitable dispersant and/or binder. Any suitable dispersant and/or binder may be used without limitation. In some embodiments, for example, the dispersant and/or binder may include anionic polyacrylamides, polyacrylates, polymethacrylates, polyvinyl alcohol, starch, methyl cellulose, etc. As would be understood by those of ordinary skill in the art, while the dispersant and binder may have similar chemical structures, they may differ in functionality within the slurry composition, and in molecule size or molecular weight. For example, in some embodiments, the binder may include a longer chain polyacrylate, polyalkene carbonate, or polyacrylamide for thickening and/or coagulation of the slurry composition, while the dispersant may be a relatively shorter, charged species capable of surrounding the particles in the slurry to prevent agglomeration through charge repulsion. The amount of the dispersant and/or binder is not particularly limited, but in some embodiments, may be included in an amount of 0.7 to 1.7% by dry weight. Water is used to adjust the solids content of the slurry, which may be 35% to 65%, or 40% to 50%.

The particulate substrate is mixed with the dispersant and/or binder in the slurry mixer 20, and then delivered to the spray dryer 30. In the spray dryer 30, the slurry may be heated. The slurry may be heated to any suitable degree and/or at any suitable temperature. For example, in some embodiments, the slurry may be heated in the spray dryer 30 at a suitable temperature. In some embodiments, the slurry may be heated at least partially using recycled flue gas heat in order to decrease energy costs as well as cool the flue gas prior to environmental handling. The spray dryer 30 can then thermally spray the slurry onto a "seed" particle of the substrate particulate. In this process, the spray dryer 30 sprays layers of the slurry onto the seed particles, and each layer increases the diameter or particle size of the uncoated particulates.

The particles/particulates output by the spray dryer 30 are typically spherical in shape. However, spherical particles may not be ideal for roofing applications. For example, spherical particles necessitate adding a greater weight of the particles to completely cover a surface (as compared to more platy particles). Also, spherical particles may have decreased solar reflectivity due to insufficient packing, and may pose a safety (e.g., slip) hazard that could lead to undesired lawsuits. Therefore, according to embodiments of the present disclosure, the spray dried particles are delivered from the spray dryer 30 to the crusher 40, where the spray dried particulates are crushed to flatten them to more platy, highly angular particles/granules, and to break the spherical particles into a distribution of more platy particles that will facilitate better surface coverage. The crusher apparatus and crusher settings are discussed in more detail above, e.g., a crusher gap setting of $6/100$ of an inch (0.06") to $7/100$ of an inch (0.07").

According to some embodiments, after crushing, the particles can be filtered or screened through the first screen 50 to adjust the particle size prior to being sent to the kiln. As generally discussed above in connection with the structure of the first and second screens 50 and 70, the first screen 50 may separate the particles into three fractions, i.e., a first fraction including particles larger than mesh 8 (i.e., 2380 microns), a second fraction including particles smaller than mesh 100 (150 microns), and a third fraction including particles that are larger than mesh 100 and smaller than mesh 8. According to embodiments of the present disclosure, the third fraction (i.e., particles smaller than mesh 8 but larger than mesh 100) is delivered directly to the kiln 60, the second fraction (i.e., those smaller than mesh 100) are delivered back to the spray dryer 30 where they can gain particle size before being delivered back through the crusher 40, and the first fraction (i.e., those larger than mesh 8) are delivered back to the slurry mixer 20.

After filtering/screening, the filtered particles are delivered to the kiln, where they are heated/calcined at an appropriate temperature. As discussed generally above, the kiln temperature may be selected according to the desired total solar reflectance, bulk and apparent densities, toughness and dust properties. For example, in some embodiments, as also described above, the particles may be heated in the kiln at a temperature of 1050° C. to 1250° C., or 1100° C. to 1200° C.

After heating in the kiln, the particulates may be cooled and then filtered/screened again before being delivered to the coating system/operation. As generally discussed above in connection with the first screening, the second screening also separates the particles (from the kiln) into three fractions, i.e., a first fraction including particles larger than mesh 8 (i.e., 2380 microns), a second fraction including particles smaller than mesh 100 (150 microns), and a third fraction including particles that are larger than mesh 100 and smaller than mesh 8. According to embodiments of the present disclosure, the third fraction (i.e., particles smaller than mesh 8 but larger than mesh 100) is delivered directly to the coating system/operation 200, the second fraction (i.e., those smaller than mesh 100) are delivered back to the spray dryer 30 where they can gain particle size before being delivered back through the crusher 40 and kiln 60, and the first fraction (i.e., those larger than mesh 8) are delivered back to the slurry mixer 20.

Figure 6:
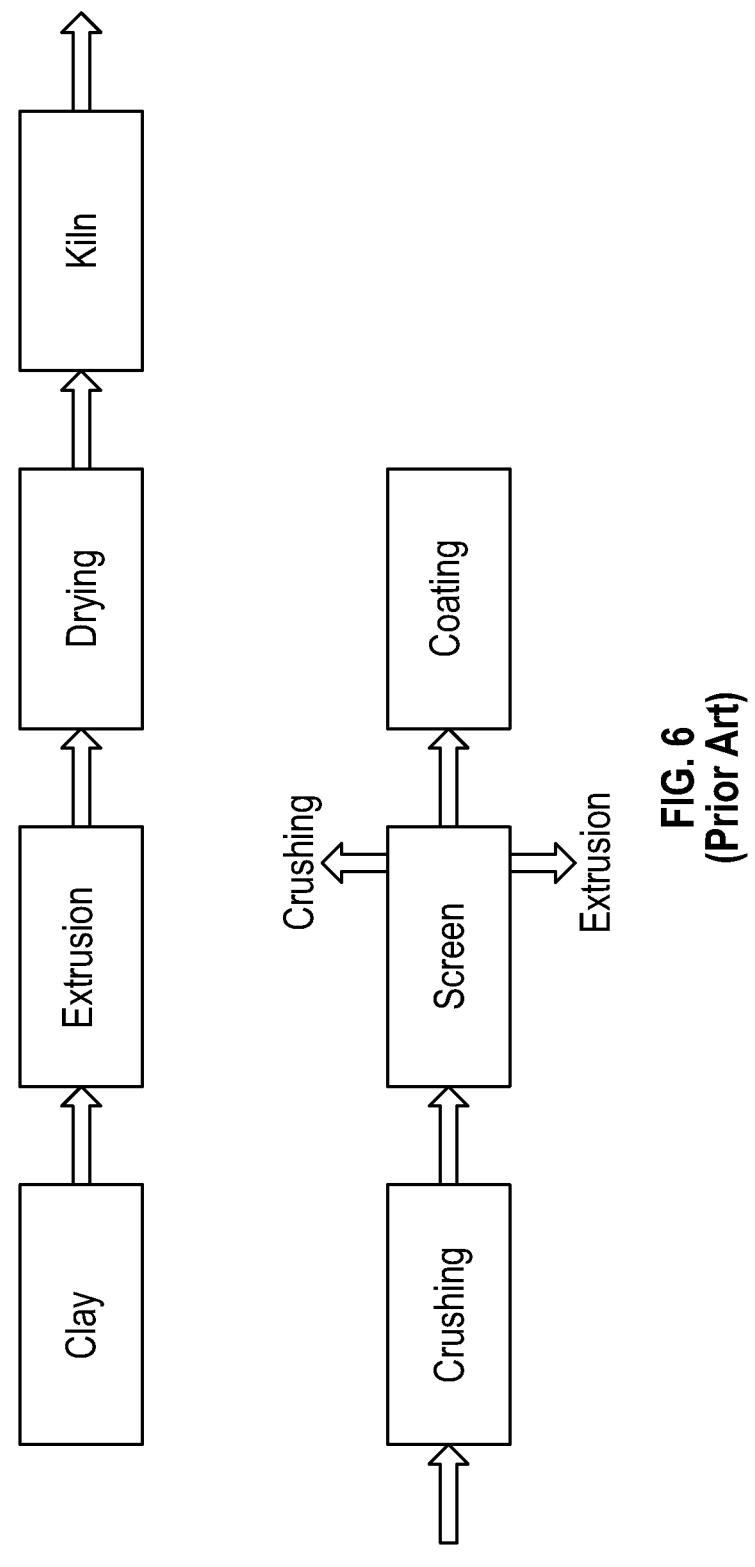
FIG. 6 is a schematic showing a conventional process of extruding, drying and heating granules prior to crushing.

As shown in FIG. 1, the processes according to embodiments of the present invention involve spray drying a slurry and crushing a spray dried particulate prior to delivering the particles to the kiln. In contrast, as shown in FIG. 6, conventional processes instead extrude, dry, and then kiln granules prior to crushing. As discussed generally above, the particles prepared according to processes according to the present disclosure (i.e., crushed prior to the kiln, etc.) exhibit markedly improved properties and characteristics, including improved total solar reflectance, bulk and apparent densities, toughness and dust level.

Although various embodiments of the disclosure have been described, additional modifications and variations will be apparent to those skilled in the art. For example, the compositions and particulates may have additional components, which may be present in various suitable amounts, for example, other additives suitable to improve strength, reduce odor, and/or otherwise modify the properties of the composition and particulates manufactured. Similarly, the methods of preparing the compositions and particulates as described herein by way of example embodiments may be modified in accordance with the knowledge in the field to which the various embodiments pertain. For example, the methods of preparing the compositions and particulates may include additional steps, may be performed at various temperatures, and/or may be otherwise suitably modified (e.g., as described with reference to the compositions and particulates). As such, the disclosure is not limited to the embodiments specifically disclosed, and the composition, the particulates, and the methods of preparing the compositions and particulates may be modified without departing from the disclosure, which is limited only by the appended claims and equivalents thereof.

Throughout the text and claims, any use of the word "about" reflects the penumbra of variation associated with measurement, significant figures, and interchangeability, all as understood by a person having ordinary skill in the art to which this disclosure pertains. Further, as used herein, the term "substantially" is used as a term of approximation and not as a term of degree, and is intended to account for normal variations and deviations in the measurement or assessment associated with the composition, the particulates, and the method of preparing the compositions and particulates (e.g., in the description of physical or chemical properties of various components or compositions and in the description of amounts of various components). The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reflective particulate material, comprising an uncoated particulate substrate having a total solar reflectance of 80% to 87%, a toughness as measured according to ASTM D1865M-09 of 1% fines or lower, an apparent density of 2.75 $g/cm^3$ or greater, and a dust index of 1 or lower, wherein the uncoated particulate substrate is selected from group consisting of transition metal oxides, clays, calcium silicates, pyrophyllites, and combinations thereof.

2. The reflective particulate material according to claim 1, wherein the uncoated particulate substrate is selected from transition metal oxides, calcium silicates, and pyrophyllites.

3. The reflective particulate material according to claim 1, wherein the uncoated particulate substrate comprises at least one of titanium dioxide, a pyrophyllite, a calcium silicate, a hydrous kaolin clay and a calcined kaolin clay.

4. The reflective particulate material according to claim 1, wherein the uncoated particulate substrate comprises a hydrous kaolin clay, a calcined kaolin clay, or a combination thereof.

5. The reflective particulate material according to claim 1, wherein the uncoated particulate substrate is coated to form a coated solar reflective granule.

6. The reflective particulate material according to claim 1, wherein the uncoated particulate substrate has an apparent density of 2.77 $g/cm^3$ or greater.

7. The reflective particulate material according to claim 1, wherein the particulate substrate has a toughness as measured according to ASTM D1865M-09 within a range of from of 0 to 0.6% fines.

8. The reflective particulate material according to claim 1, wherein the particulate substrate has a dust index with a range of 0.5 to 0.8.

9. The reflective particulate material according to claim 1, wherein the reflective particulate material has a platy shape.

10. A cool roof comprising the reflective particulate material according to claim 1.

* * * * *